Dec. 18, 1951 — P. LAMBERT — 2,579,005
INSTALLATION FOR UNDERGROUND STORAGE RESERVOIRS
FOR LIQUIDS NONMISCIBLE WITH WATER

Filed April 10, 1948 — 4 Sheets-Sheet 1

INVENTOR.
Paul Lambert
BY

Dec. 18, 1951 P. LAMBERT 2,579,005
INSTALLATION FOR UNDERGROUND STORAGE RESERVOIRS
FOR LIQUIDS NONMISCIBLE WITH WATER
Filed April 10, 1948 4 Sheets-Sheet 2

INVENTOR.
Paul Lambert
BY

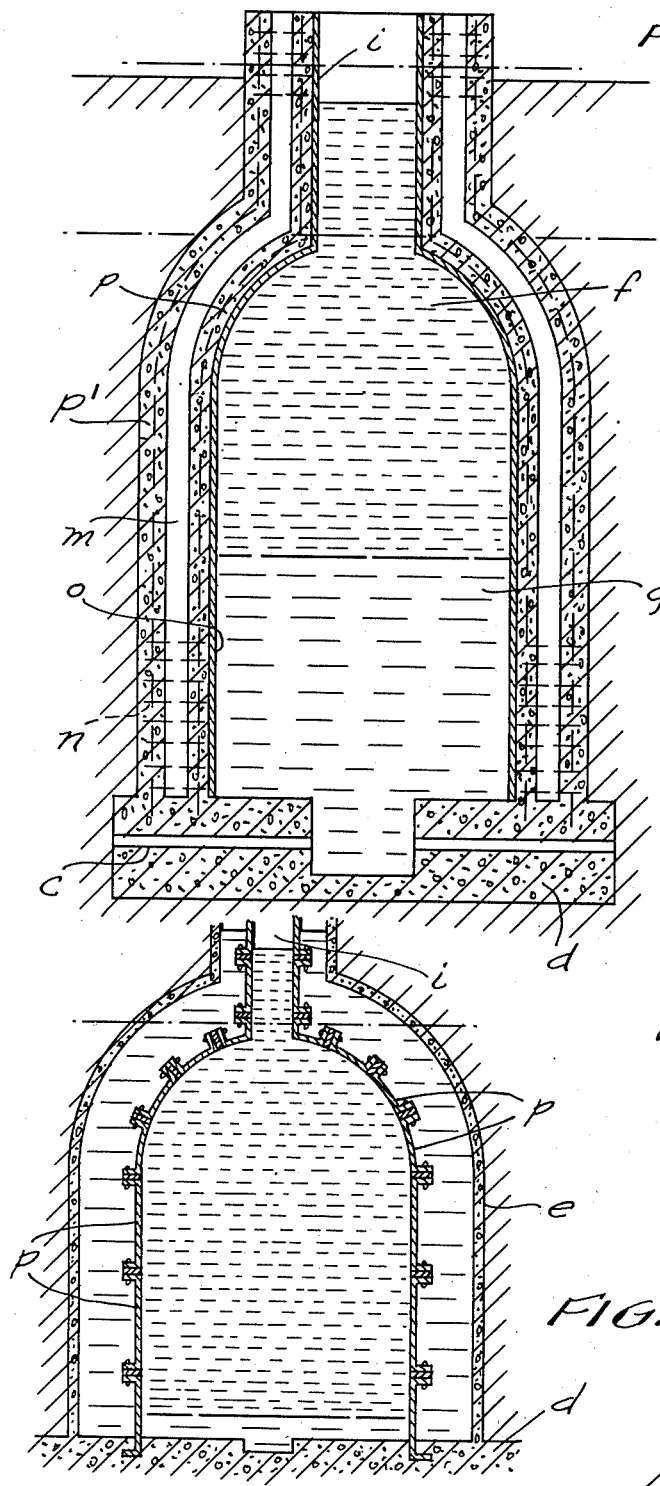
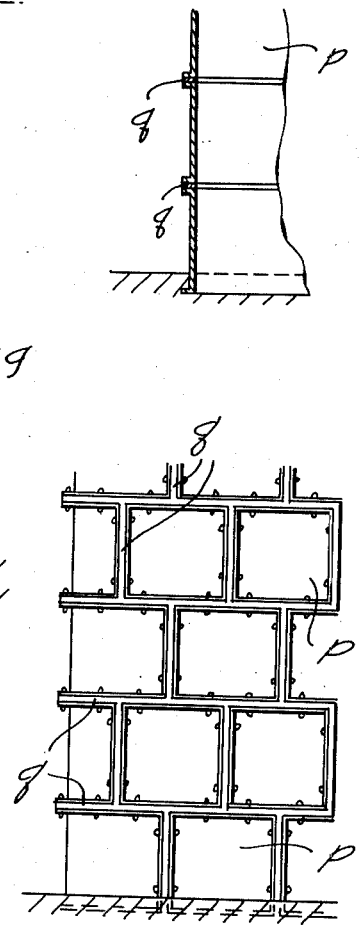
FIG. 5.
FIG. 6.
FIG. 7.
FIG. 8.
INVENTOR.
Paul Lambert

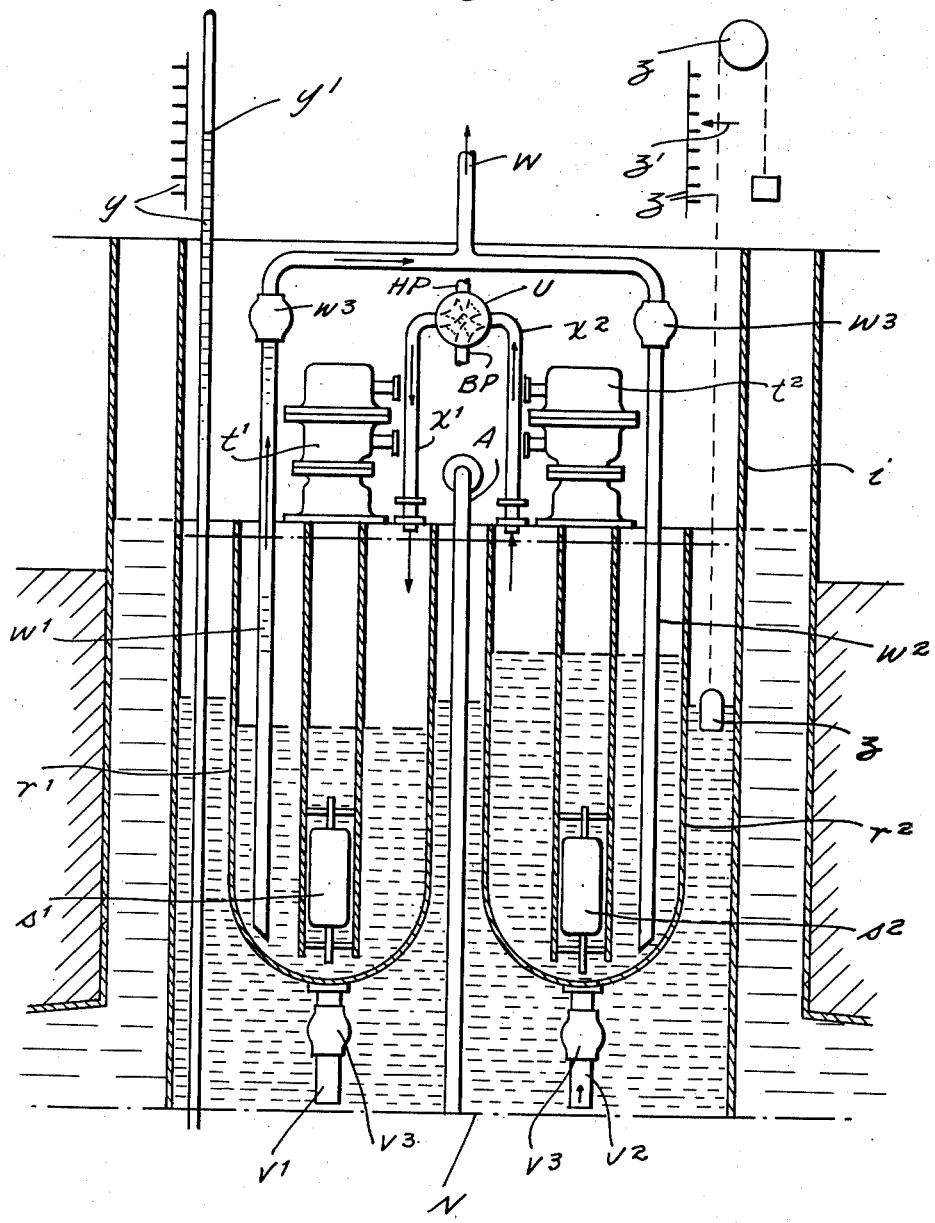

Patented Dec. 18, 1951

2,579,005

UNITED STATES PATENT OFFICE 2,579,005

INSTALLATION FOR UNDERGROUND STORAGE RESERVOIRS FOR LIQUIDS NON-MISCIBLE WITH WATER

Paul Lambert, Paris, France

Application April 10, 1948, Serial No. 20,352

10 Claims. (Cl. 222—128)

The invention relates to an installation of underground storage tanks for liquids which are not miscible with water and the density of which differs from that of water, such as motor fuels and lubricating oils of all kinds, said storage tanks being secure from risks of fire and explosion and from attack from the air, and being provided with reliable, safe and convenient means for pumping in and drawing off the liquids to be warehoused, by means of hydro-pneumatic pumping apparatus the control of which is effected in a simple manner from a more or less great distance if desired.

The installation according to the invention consists in the combination, with an electric or thermo-pneumatic central controlling station, of one or more storage tanks constructed of suitable materials, underground, in a manner which depends on the nature of the ground, to be hereafter described in detail.

The ground in which the installation of the storage tanks is located will be generally water bearing, for warehouses for the storage of liquids of the kind mentioned, which are mostly imported in sea-going vessels, are most conveniently located in the vicinity of quays disposed for cargo- or tank-boats to draw alongside, that is to say, in the vicinity of a stream, or of a lake, or of the sea itself.

When the installation comprises a plurality of storage tanks, these may be grouped together or spaced from each other as may be desired, these storage tanks being preferably identical in structure and shape and size, and constructed in a manner which will naturally vary according to circumstances, and as to whether they are made in caves or galleries hollowed out tunnel-fashion, in the rock or in alluvial soil, in a plain or in a water-bearing sheet, at the edge of a water way, of a lake, or on a coast line.

According to the invention, the said storage tanks are so constructed and so disposed with respect to a surrounding body of water that each tank comprises a submerged reservoir the internal and external faces of the walls of which are subjected on every horizontal plane to variable pressures the difference of which constantly remains inferior to a small value and is acting at every point of the structure from the outside towards the inside, so as to ensure a maximum security in the exploitation and to eliminate any possible loss of the warehoused liquid under any circumstances.

In order to achieve this result, each tank is constituted by an inner reservoir surrounded by an outer envelope immersed in an external body of water, natural or provided artificially, in direct or indirect communication with the bottom of the inner reservoir, the lower portion of which is filled with water while the upper portion is filled with the warehoused liquid, motor fuel or lubricating oil up to a level slightly superior to the level of the external water sheet, depending on the density of the warehoused liquid; the annular space between the inner reservoir and the surrounding envelope being filled with water not in communication with any external source to a level which is higher than the level of the body of water outside the storage tank by a calculated amount, so as to produce a differential hydrostatic pressure on the external wall-face of the said reservoir, of a desired amount, directed from the outside towards the inside of the said reservoir.

Each storage tank is constituted by an assembly of interchangeable elements, effected in situ, said elements being metallic or otherwise and prefabricated in mass-production, assembled according to some figure of revolution: cylinder, cone, dome, etc. permitting as much as possible a rational utilization of the various construction materials employed.

In the case of an installation with multiple reservoirs, this installation will advantageously comprise a number of identical storage tanks of equal capacity, situated along the sides of a regular polygon the number of sides of which is equal to that of the reservoirs, which are accordingly disposed symmetrically about an axis on which is situated a vertical cistern or well of cylindrical or prismatic shape, communicating on the one hand, through its permeable bottom, with the water-bearing sheet or large equivalent body of water in the midst of, or close to which the storage tanks are constructed and, on the other hand, by underground conduits disposed star-fashion, with the various reservoirs on periphery of the said polygon. This central well is adapted to fulfil the part of a common regulating reservoir for the flow of the water into the various reservoirs to compensate for any warehoused liquid drawn off, or out of these reservoirs to make room for any such liquid being pumped into them.

The handling of the liquid to be stored or drawn off, in the various storage tanks of a same installation, whether they be grouped close together or built at some distance from each other, is, according to the invention, carried out by means of electric- or hydro-pneumatic apparatus functioning automatically through the action of servomotors and telecontrol, under the localized action of compressed air or of a suction, for example, in elevating devices adapted for alternate working ensuring a continuous flow of liquid, housed in chambers preferably situated above the reservoirs of the storage tanks, and permitting to obtain at any moment, automatically, from a distance, any adjustable movement of the warehoused or to be warehoused liquids, as may be desired.

Referring to the appended drawings, which represent diagrammatically, as examples, various manners of construction of the underground storage tanks, object of the invention:

Fig. 5 is a vertical section of a storage tank, showing a manner of masonry construction.

Fig. 6 represents an alternative construction of a storage tank made of pre-fabricated metallic elements.

Figs. 7 and 8 show the particular manner of construction and of assembling the metallic elements with which the storage tank shown in Fig. 6 is constituted.

Fig. 9 is a vertical section of a preferred arrangement of apparatus for the pneumatic handling of the warehoused or to be warehoused liquid.

Figure 1:
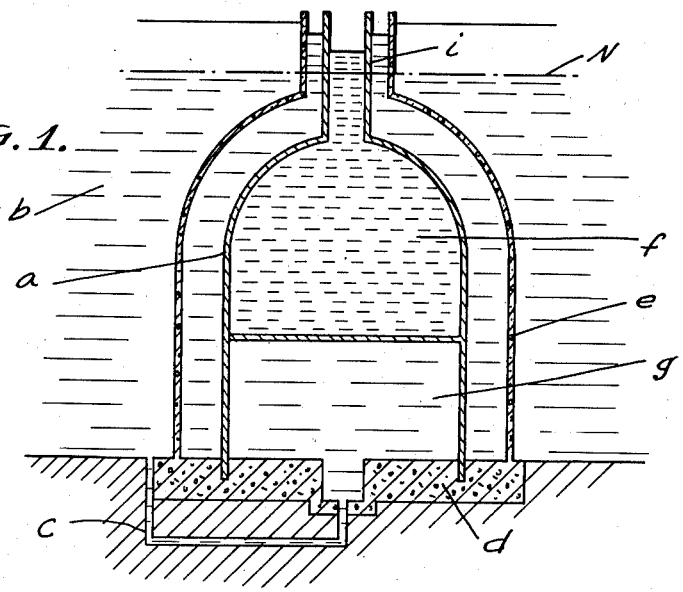
Fig. 1 is a vertical section of a storage tank forming an element of an installation according to the invention.

As it is seen in Fig. 1, a storage tank forming a constituting element of an installation according to the invention consists in a fluid-tight reservoir of cylindrical shape surmounted by a dome and being surrounded by a fluid-tight envelope, the arrangement comprising therefore two fluid-tight walls $a$ and $e$ on a fluid-tight flooring $d$; between these two walls is an isolated annular space adapted to be filled with water, the whole being surrounded by an external body of water $b$, with which the reservoir is in constant communication by means of a conduit $c$ opening at the bottom thereof.

The liquid to be warehoused, which must be non-miscible with water and lighter than water, is stored in $f$, above the water $g$ derived from the external body of water $b$. The height of the water in the annular space surrounding the wall $a$ of the reservoir is slightly above the level N of the external body of water.

It will be understood that, since the space round the envelope $e$ of the storage reservoir and the reservoir itself enclosed by the wall $a$ are in communication, they are in hydrostatic equilibrium, the level inside the reservoir being higher than the level of the water in the external body of water, since the density of the warehoused liquid $f$ is less than that of the water underneath it. Since the level of water in the annular space between the walls $a$ and $e$ is adjusted to a height slightly above that of the level of water in the external water body, the pressure on the external face of the wall $a$ is slightly greater than the pressure on its internal face, and the difference between these two pressures remains always directed from the outside towards the inside of the reservoir. Moreover, this difference remains always slight whatever may be the height of the level with respect to which these pressures are measured, since the level of the water in the annular space is kept slightly higher than the level N of the external water body, which level remains approximately constant.

In practice, this difference of pressures outside and inside the reservoir is small and of an order of pressure of that corresponding to a small height of water, for example 1 m. 50, approximately, this being determined at will by adjusting the water level in the annular space between the walls, and which a simple pneumatic device maintains at a constant value when the level of the external sheet of water varies and even when it falls down to its lowest seasonal level. It is therefore seen that in all circumstances there always exists a slight excess of pressure, adjustable at will, ensuring hydrostatically, on the one hand, the entrance of water from the annular space between the walls $a$ and $e$ into the reservoir in case of a leak in the wall $a$ of this reservoir, and, on the other hand, the exit of water from this annular space to the external sheet of water $b$ in case of a leak in the wall of the envelope $e$.

The above described arrangement constitutes therefore a safety device permitting to automatically avoid any loss of a warehoused liquid into the ground in case of accidental leakage, since only water from the annular space or from the external water sheet can penetrate into the reservoir; in the former case the water, being heavier than the warehoused liquid, falls to the bottom of the reservoir and thence proceeds to the external water body. Moreover, it also provides for the hydrostatic balance of pressures on each face of the external and internal walls of the structure.

It is therefore possible to construct such storage reservoirs at a lesser first cost and to ensure the upkeep in the most advantageous conditions. Besides, owing to the fact that the installation is underground, the temperature is uniform and there is consequently a minimum of play due to expansion at the joints and points of assembly of the two walls of each storage tank. Also, all risks of freezing are eliminated.

In case of a leak, due, say, to a crack in a wall or a bad joint of two metallic adjacent elements, this leak is detected by the lowering of the level of the water in the annular space between the two walls, as this level should normally remain constant. It is a fact that leaks of this kind are of little importance for the proper working of the installation as a whole and their extent can be estimated immediately by measuring the quantity of water which one must introduce in the annular space between the two walls in a unit time to restore and maintain the normal level.

The hydrostatic safety arrangement described above, is particularly adapted to pumping and distributing operations by means of alternative constant forces of suction and compression, whatever may be the quantities of warehoused liquids. There is no diffusion whatsoever in the atmosphere of vapours of a volatile stored liquid, nor can there ever be any risk of internal explosion, since the reservoirs are submerged and are always full of liquid, the whole of the volume of water and of the volume of the warehoused liquid corresponding to the total capacity of each reservoir.

Figure 2:
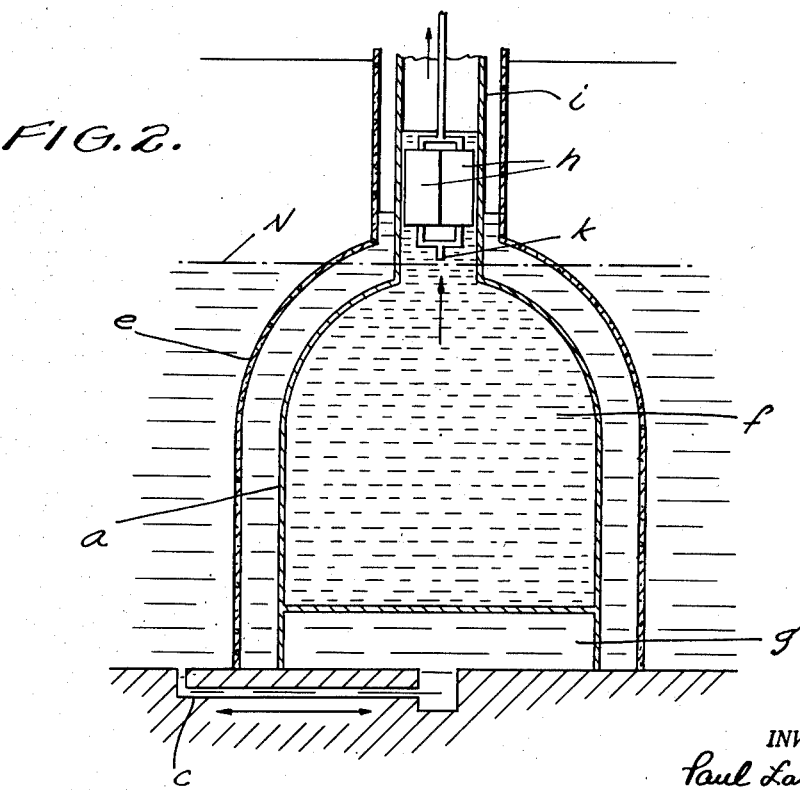
Fig. 2 is a vertical section of a storage tank with its apparatus for the pneumatic handling of the stored liquid.

Fig. 2 shows at $h$ the position of the pneumatic elevator unit, disposed in the central chamber $i$ above the reservoir, and above the level N of the external water sheet.

Figure 3:
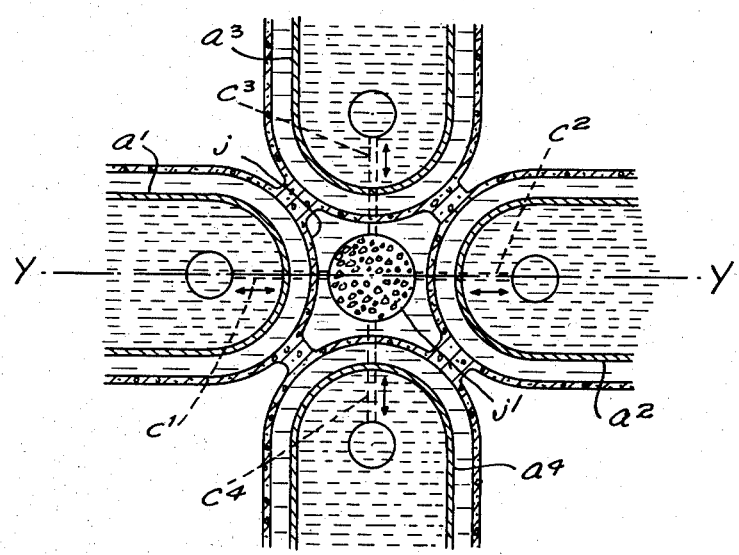
Fig. 3 is a horizontal section, along the line $x-x$ of Fig. 4, of an installation comprising several storage tanks grouped round a central well.
Figure 4:
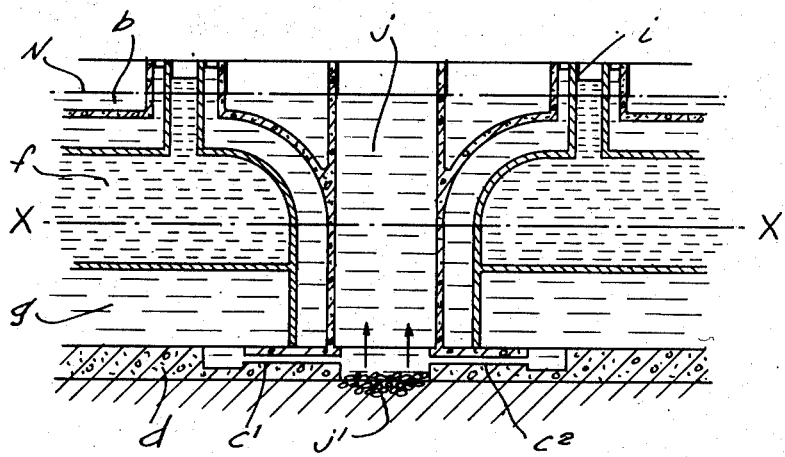
Fig. 4 is a vertical section along the line $y-y$ of Fig. 3, of the installation shown in this latter figure.

Figs. 3 and 4 represent the arrangement of a multiple storage tank installation, constructed on the principle described above, permitting the simultaneous warehousing of several kinds of liquids, for example, motor-fuels and lubricating oils. In this example, an installation has been supposed to comprise four identical but distinct safety storage tanks $a^1$, $a^2$, $a^3$ and $a^4$, disposed in the shape of a cross round a central well $j$ the bottom of which, of pebbles and loose stones $j^1$, or other materials having a great permeability, communicates with the external water sheet $b$. All the movements of water in the lower portions of these reservoirs take place through the passages $c^1$, $c^2$, $c^3$ and $c^4$, at floor level, which effect the communication between the reservoirs and the central wall $j$, which constitutes a common regulator. The surface level of the water in this well always maintains itself at the sensibly constant level N of the external water sheet $b$. The height of the level of the upper surface of the warehoused liquid, above the surface of the water underneath will vary from a maximum value corresponding to the complete filling of the reservoir by the liquid to be stored, to a minimum value, practically nil, corresponding to the complete filling of the reservoir with water when the stored liquid has been entirely drawn off.

For the determination of the vertical dimensions of the reservoirs, one must therefore take into consideration the maximum height of the warehoused liquid, with a view to establish, in the chamber above each reservoir, pumping devices adapted to effect, by suction and compression of the warehoused liquids, the filling or drawing off operations. There must also be taken into consideration, in order to estimate this level in the storage reservoirs, the different densities of the various liquids which are stored therein, as also the density of the liquid of the external water sheet, particularly if the latter be salt water. This evaluation will enable one to ascertain the height of the chambers $i$ above the reservoirs, for the installation in these chambers of the pneumatic elevator units, which can quite well work without inconvenience while immersed in the liquid to be moved. However, the suction orifice $k$ of this elevator unit shall advantageously be situated very little above the level N of the external water sheet, as is shown in Fig. 2, this permitting to automatically put a stop to the suction as soon as the corresponding reservoir is empty of warehoused liquid and is filled instead with water compensating the withdrawal of the said warehoused liquid, that is to say, at the moment when the thin residual layer of the warehoused liquid reaches almost the level of the external water sheet.

The storage reservoirs may be constructed in different manners. Fig. 5 shows a manner of construction in which the double wall $l$—$l^1$, erected on the common fluid-tight flooring $d$, is made of masonry built on the ground so that it is quite impermeable to the water of the external water sheet $b$ which wets it on the whole of its outer surface. Between these two walls $l$ and $l^1$ is provided the intermediate annular sheath of water necessary to cause the hydrostatic excess of pressure after filling up to the upper constant level ascertained by calculation. This masonry may be provided with metallic reinforcing bracing $m$ connected to reinforcing members $n$ immersed in the mass of concrete of the two walls $l$ and $l^1$. On the whole of its internal surface, the wall $a$ will advantageously be provided with a thin coating $o^2$ of a material not attacked by the liquid stored in the reservoir, to ensure the perfect fluid-tightness of the latter; this coating needs not of course be applied to the flooring. The coating may notably be a vitrified coating, or a coating of plastic paint of tested special composition or of any other material fulfilling the same purpose.

Figs. 6, 7 and 8 represent another manner of construction of the reservoirs, in which these are formed of prefabricated metallic elements $p$, stamped or moulded, assembled on the spot by means of bolts, with intervening packing $q$ of plastic material forming fluid-tight joints. An outer envelope $e$ of masonry, solid with the flooring $d$, leaves, between itself and the metallic wall $a$ made of elements $p$, the annular intermediate isolating sheath of stagnant water ensuring the constant hydrostatic pressure excess.

Instead of being constituted by metallic elements, the wall of the reservoir could be composed of prefabricated masonry elements with interlocking members permitting their rapid erection on the spot and their assembly with cement in a fluid-tight manner.

As stated before, the handling of the liquids stored in the reservoirs takes place by means of pneumatic elevators disposed in the chambers situated above the reservoirs. Fig. 9 shows, as an example, a preferred arrangement of elevator, in which the pumping and the distribution take place pneumatically under the action of a constant mass of compressed or rarefied gas, alternatively, coming from an electro- or a thermo-pneumatic central station.

In this arrangement, the elevator is constituted by two vessels $r^1$ and $r^2$, with paired capacities, placed side by side in the chamber $i$ and comprising internally floats $s^1$ and $s^2$ which actuate the devices $t^1$ and $t^2$ controlling the reversing four-way tap $u$ in a manner easily conceived. Near the bottom of the vessels $r^1$ and $r^2$, the suction passages $v^1$ and $v^2$ open a little above the level N of the external water sheet, as has been explained before. Inside these vessels $r^1$ and $r^2$ dip the exhaust passages $w^1$ and $w^2$ ending in the main exhaust passage $w$. Valves of the retaining type $v^3$ and $v^3$, respectively, are disposed at the required locations on the suction passages $v^1$ and $v^2$ and the exhaust passages $w^1$ and $w^2$.

The admission and the suction of the air or other working gas, which is employed in a closed circuit, takes place in each of the vessels $r^1$ and $r^2$ by passages $x^1$ and $x^2$ connected respectively and alternately by the reversing four-way tap $u$ to the high pressure passage HP and low pressure passage BP, respectively, for the distribution of the pneumatic energy of the installation.

The filling of the corresponding reservoir takes place through a passage A for the entrance of the liquid to be warehoused, which passage can without inconvenience be made to dip deeply into this reservoir, since the liquid to be warehoused is not miscible with, and is lighter than water.

For the emptying of the storage reservoir, one of the paired capacities, which, on Fig. 9, we shall suppose to be the capacity $r^1$ at the instant considered, is in communication by the passage $x^1$ and by the tap $u$ with the high pressure distribution passage HP, so that the pressure of the air or other working gas, acting on the surface of the liquid contained in this vessel $r^1$, causes it to be forced through the passages $w^1$ and $w$. The float $s^1$, in falling back upon its lower stop-seat when the vessel $r^1$ is empty, causes automatically the reversal of the position of the four-way tap $u$ by means of the devices $t^1$ and $t^2$ and, consequently, the reversal of the movement of the air or other working gas in the passages $x^1$ and $x^2$. When this reversal has taken place, the vessel $r^1$ becomes subjected to suction, while the vessel $r^2$ is subjected to pressure.

In this manner, through the suction passages $v^1$ and $v^2$, and by the passages $w^1$ and $w^2$ for the forcing pressure, the liquid in the corresponding reservoir is pumped to a level always sensibly constant of the corresponding upper chamber, in the best conditions of efficiency and security.

The arrangement can be advantageously completed by a gauging device permitting at any instant ot ascertain the quantity of liquid stored in the reservoir, above the variable complementary volume of water underneath, denser and non-miscible with the stored liquid. This quantity of stored liquid is, in fact, a direct function of the variable height of its level, reckoned above the level of the water underneath; it can therefore be ascertained at any instant. Measurement by direct reading can be obtained by means of a barometric gauge $y$, the level $y^1$ of which gives at any instant the volume of stored liquid contained in the reservoir. It can also be obtained by means of a gauge $z$ with a float, the cursor of which, $z^1$, is moveable in front of a graduation and gives constantly and directly the indication of the total volume of the warehoused liquid in the corresponding reservoir.

For the storage and handling of heavy chemical liquids non-miscible with water, such as carbon disulphide, the arrangements described above will involve certain variations in the apparatus, particularly in view of ensuring the constancy of the hydrostatic internally directed pressure excess and the complete isolation of dangerous liquids from any gaseous atmosphere, by means of a layer of water above the stored liquid instead of underneath it, as well in the reservoirs as in the paired vessels of the pneumatic elevator unit.

It is understood that, with the system of underground storage tanks constituting the object of the invention, the installation can be constructed with a maximum of security, a minimum of cost and the best conditions of preservation and maintenance, providing concealed wharves for the storage of liquids such as motor-fuels or lubricating oils, in which the handling of these liquids is easy and certain and can be, if desired, controlled automatically from a distance. In addition, it lends itself very easily to various manners of construction of the reservoirs, adapted in each case to the particular nature of the soil. Finally, it allows to advantageously utilize the aqueous sheets in the vicinity, existing generally near rivers, canals, natural or artificial lakes, or on the sea coast.

It is understood that the details of construction and of operation which have been shown and described above are only examples of manners of carrying out the invention, which admits all equivalent alternatives. Notably, the pumping units combined with each reservoir could be of any other suitable type, the movement of the liquids being obtained by means of any apparatus effecting the suction of the stored liquids and the forcing back of the latter in vessels outside.

What I claim is:

1. In an installation for storing liquids immiscible with water in subterranean reservoirs located in the ground water, in combination, a reservoir for liquid; means for putting the lower part of the reservoir in communication with the surrounding ground water carrying layer; and an outer double wall enclosing said reservoir and defining a gap between itself and said reservoir, said gap being adapted to be filled with water whereby the difference between the pressures exerted on the walls of said reservoir by the water in said gap and the water and liquid within said reservoir is relatively small and always directed from the outside of said reservoir towards the inside thereof.

2. An installation for storing liquids immiscible with water and having a lower density than water in a subterranean chamber located in the ground water layer, comprising in combination, a fluid-tight flooring arranged below the ground water level; a chamber having an inner wall erected on said fluid-tight flooring and having an inner duct forming the top of said chamber; an outer wall erected on said fluid-tight flooring and enclosing said inner wall; an outer duct forming the top of said outer wall and enclosing said inner duct; a gap between said outer wall and said inner wall; an annular gap between said outer duct and said inner duct, said annular gap communicating with said gap between said walls and extending beyond the ground water level; and a conduit penetrating said fluid-tight flooring and connecting the interior of said chamber and the ground water layer whereby said chamber is filled in its lower part with ground water and in its upper part with liquid, said gaps between said walls and said ducts being adapted to be filled with water to a level exceeding the level of the liquid inside said chamber and said inner duct whereby said chamber is subject to the difference of the pressures between the water in said gaps and the water and liquid inside said chamber, said pressure difference being directed towards the interior of said chamber.

3. An installation for storing liquids immiscible with water and having a lower density than water in a subterranean chamber located in the ground water layer, comprising in combination, a fluid-tight flooring arranged below the ground water level; a chamber having an inner wall erected on said fluid-tight flooring and having an inner duct forming the top of said chamber; an outer wall erected on said fluid-tight flooring and enclosing said inner wall, said inner wall and said outer wall consisting of masonry erected on said fluid-tight flooring; an outer duct forming the top of said outer wall and enclosing said inner duct; a gap between said outer wall and said inner wall; an annular gap between said outer duct and said inner duct, said annular gap communicating with said gap between said walls and extending beyond the ground water level; and a conduit penetrating said fluid-tight flooring and connecting the interior of said chamber and the ground water layer whereby said chamber is filled in its lower part with ground water and in its upper part with liquid, said gaps between said walls and said ducts being adapted to be filled with water to a level exceeding the level of the liquid inside said chamber and said inner duct whereby said chamber is subject to the difference of the pressure between the water in said gaps and the water and liquid inside said chamber, said pressure difference being directed toward the interior of said chamber.

4. An installation for storing liquids immiscible with water and having a lower density than water in a subterranean chamber located in the ground water layer, comprising in combination, a fluid-tight flooring arranged below the ground water level; a chamber having an inner wall erected on said fluid-tight flooring and having an inner duct forming the top of said chamber; an outer wall erected on said fluid-tight flooring and enclosing said inner wall, said inner wall and said outer wall consisting of masonry erected on said fluid-tight flooring; reinforcing members embedded in said walls; metallic reinforcing bracings connected to said reinforcing members; an outer duct forming the top of said outer wall and enclosing said inner duct; a gap between said outer wall and said inner wall; an annular gap between said outer duct and said inner duct, said annular gap communicating with said gap between said walls and extending beyond the ground water level; and a conduit penetrating said fluid-tight flooring and connecting the interior of said chamber and the ground water layer whereby said chamber is filled in its lower part with ground water and in its upper part with liquid, said gaps between said walls and said ducts being adapted to be filled with water to a level exceeding the level of the liquid inside said chamber and said inner duct whereby said chamber is subject to the difference of the pressures between the water in said gaps and the water and liquid inside said chamber, said pressure difference being directed toward the interior of said chamber.

5. An installation for storing liquids immiscible with water and having a lower density than water in a subterranean chamber located in the ground water layer, comprising in combination, a fluid-tight flooring arranged below the ground water level; a chamber having an inner wall erected on said fluid-tight flooring and having an inner duct forming the top of said chamber; pre-fabricated masonry elements forming said inner wall; interlocking members arranged on said masonry elements for permitting a rapid erection of said inner wall; an outer wall erected on said fluid-tight flooring and enclosing said inner wall; an outer duct forming the top of said outer wall and enclosing said inner duct; a gap between said outer wall and said inner wall; an annular gap between said outer duct and said inner duct, said annular gap communicating with said gap between said walls and extending beyond the ground water level; and a conduit penetrating said fluid-tight flooring and connecting the interior of said chamber and the ground water layer whereby said chamber is filled in its lower part with ground water and in its upper part with liquid, said gaps between said walls and said ducts being adapted to be filled with water to a level exceeding the level of the liquid inside said chamber and said inner duct whereby said chamber is subject to the difference of the pressures between the water in said gaps and the water and liquid inside said chamber, said pressure difference being directed toward the interior of said chamber.

6. An installation for storing liquids immiscible with water and having a lower density than water in a subterranean chamber located in the ground water layer, comprising in combination, a fluid-tight flooring arranged below the ground water level; a chamber having an inner wall erected on said fluid-tight flooring and having an inner duct forming the top of said chamber; pre-fabricated metallic elements forming said inner wall; fluid-tight packings of plastic material arranged between said metallic elements; an outer wall erected on said fluid-tight flooring and enclosing said inner wall; an outer duct forming the top of said outer wall and enclosing said inner duct; a gap between said outer wall and said inner wall; an annular gap between said outer duct and said inner duct, said annular gap communicating with said gap between said walls and extending beyond the ground water level; and a conduit penetrating said fluid-tight flooring and connecting the interior of said chamber and the ground water layer whereby said chamber is filled in its lower part with ground water and in its upper part with liquid, said gaps between said walls and said ducts being adapted to be filled with water to a level exceeding the level of the liquid inside said chamber and said inner duct whereby said chamber is subject to the difference of the pressure between the water in said gaps and the water and liquid inside said chamber, said pressure difference being directed toward the interior of said chamber.

7. An installation for storing liquids immiscible with water and having a lower density than water, having a subterranean chamber located in the ground water layer, comprising in combination, a central well having its base in communication with the surrounding ground water layer; a fluid-tight flooring arranged below the ground water level around the base of said central well; a plurality of chambers each having an inner wall erected on said fluid-tight flooring and having inner ducts forming, respectively, the tops of said chambers; outer walls erected on said fluid-tight flooring and enclosing, respectively, said inner walls; outer ducts forming, respectively, the top of said outer walls and enclosing, respectively, said inner ducts; gaps arranged, respectively, between said outer walls and said inner walls; annular gaps arranged, respectively, between said outer ducts and said inner ducts, said annular gaps communicating, respectively, with said gaps between said walls and extending beyond the ground water level; and conduits penetrating said fluid-tight flooring and connecting, respectively, the interior of said chambers and the ground water layer whereby said chambers are filled in their lower part with the ground water and in their upper part with liquid, said gaps between said walls and said ducts being adapted to be filled with water to a level exceeding the level of the liquid inside said chambers and said inner ducts whereby said chambers are subject to the difference of the pressures between the water in said gaps and the water and liquid inside said chambers, said pressure difference being directed toward the interior of said chambers.

8. An installation for the storing and the safe handling of liquids immiscible with water and having a lower density than water, by means of subterranean reservoirs located in the ground water, comprising in combination, at least one reservoir for storing the liquid; means for putting the bottom of said reservoir in communication with the surrounding ground water; an outer wall enclosing said reservoir and defining a gap between itself and said reservoir adapted to be filled with water forming a sheath enclosing said reservoir; and pneumatically operated means for filling said reservoir with liquid and sucking the liquid from said reservoir.

9. An installation for the storing and the safe handling of liquids immiscible with water and having a lower density than water, by means of subterranean reservoirs located in the ground water, comprising in combination, at least one reservoir for storing the liquid; a fluid-tight flooring forming the fundament of construction of said reservoir; a conduit traversing said flooring and putting the bottom of said reservoir in communication with the surrounding ground water; an outer wall enclosing said reservoir and defining a gap between itself and said reservoir adapted to be filled with water forming a sheath enclosing said reservoir; and a pneumatic elevator unit arranged in the axial prolongation of the top of said reservoir for admitting and withdrawing the liquid to and from said reservoir, respectively.

10. An installation for the storing and the safe handling of liquids immiscible with water and having a lower density than water, by means of subterranean reservoirs located in the ground water, comprising in combination, a plurality of reservoirs for storing the liquid arranged around a vertical axis; a circular fluid-tight flooring forming the fundament of construction of said reservoirs; a central well arranged with its axis coinciding with the vertical axis around which said reservoirs are arranged and having a base being in communication with the surrounding ground water; conduits establishing a communication between the lower part of said well and the basis of said reservoirs, respectively, said conduits traversing said circular flooring; outer walls enclosing, respectively, said reservoirs and defining gaps, respectively, between themselves and said reservoirs, said gaps being adapted to be filled with water forming sheaths enclosing, respectively, said reservoirs; and pneumatic elevator units arranged, respectively, in the axial prolongations of the tops of said reservoirs for admitting and withdrawing the liquid to and from said reservoirs, respectively.

PAUL LAMBERT.

REFERENCES CITED

The following references are of record in the file of this patent:

UNITED STATES PATENTS

| Number | Name | Date |
|---|---|---|
| 55,970 | Jacovenco | June 26, 1866 |
| 194,847 | Shaw | Sept. 4, 1877 |
| 1,127,391 | Bathhurst | Feb. 9, 1915 |
| 1,200,337 | Fraser | Oct. 3, 1916 |
| 1,886,074 | Wortman | Nov. 1, 1932 |
| 2,285,710 | Harlow | June 9, 1942 |
| 2,337,472 | Kares | Dec. 21, 1943 |

FOREIGN PATENTS

| Number | Country | Date |
|---|---|---|
| 674,213 | France | Oct. 15, 1929 |